United States Patent [19]

Nishihara

[11] Patent Number: 4,516,654
[45] Date of Patent: May 14, 1985

[54] FRONT-WHEEL DRIVE DEVICE FOR VEHICLE

[75] Inventor: Tadao Nishihara, Ehime, Japan

[73] Assignee: Iseki & Co., Ltd., Japan

[21] Appl. No.: 512,039

[22] Filed: Jul. 8, 1983

[30] Foreign Application Priority Data

Oct. 9, 1982 [JP] Japan ................................ 57-177728

[51] Int. Cl.³ .............................................. B60K 17/30
[52] U.S. Cl. ..................................... 180/255; 180/253
[58] Field of Search ............... 180/253, 255, 256, 260, 180/261, 262, 257, 258, 259; 74/390

[56] References Cited

U.S. PATENT DOCUMENTS

| | | | |
|---|---|---|---|
| 2,801,702 | 8/1957 | Armington | 180/255 |
| 4,091,689 | 5/1978 | Huffman | 180/255 |
| 4,195,862 | 4/1980 | Specktor et al. | 180/253 |
| 4,418,785 | 12/1983 | Ehrlinger et al. | 180/255 |
| 4,442,914 | 4/1984 | Nishihara | 180/255 |

Primary Examiner—Joseph F. Peters, Jr.
Assistant Examiner—Donn McGiehan
Attorney, Agent, or Firm—Vaden, Eickenroht, Thompson & Jamison

[57] ABSTRACT

The invention relates to a front-wheel drive device for a vehicle in which an inner gear case is mounted onto the outer end of a front axle housing which contains a front-wheel drive axle, an outer gear case equipped with a gear chamber which is open toward the outside is fitted onto the inner gear case while maintaining the freedoms of steering and turning, a planetary gear mechanism is introduced into the gear chamber, the opening thereof is closed by attaching a cover supporting the front wheel axle over the outer gear case, and the front wheel axle is driven at a reduced speed by the planetary gear mechanism via a bevel gear mechanism which is driven by the front-wheel drive axle. The improvement to this device is that an inner member of the front wheel axle extends into the gear chamber, and the sun gear of the planetary gear mechanism and the bevel gear on the output side of the bevel gear mechanism are allowed to rotate freely as a unitary structure about the inner member.

3 Claims, 5 Drawing Figures

4,516,654

FRONT-WHEEL DRIVE DEVICE FOR VEHICLE

BACKGROUND OF THE INVENTION

1. Field of the Invention

The present invention relates to a front-wheel drive device which employs a bevel gear mechanism and a planetary gear mechanism.

2. Description of the Prior Art

A conventional front-wheel drive device having a gear mechanism of the above type is shown in FIG. 5. This front-wheel drive device has the advantage that a large reduction ratio can be obtained. However, in this device, a sun gear 52 of a planetary gear mechanism 51 and a sun gear axle 55 mounting a bevel gear 54 on the output side of a bevel gear mechanism 53 are supported in a bridging manner by a front wheel axle 56 and by an outer gear casing 57 which supports the front wheel axle 56. Therefore, a cumbersome operation is required when assembling the gears. Furthermore, the construction of support of this type causes the front wheel axle 56 to protrude outward beyond the outer gear casing 57 by lengths equal to the lengths of right and left bearings 58, 59. This means that the distance from an axle 60 of the center of turning of a front wheel 61 increases, the rigidity of support of the front wheel axle 56 decreases, an increased turning force is required for steering and turning the vehicle, and a cumbersome operation is required for aligning and machining the holes for fitting bearings 58, 59 that support the sun gear axle 55.

SUMMARY OF THE INVENTION

The object of the present invention is to provide a front-wheel drive device for a vehicle in which an inner gear case is mounted onto the outer end of a front axle housing which contains a front-wheel drive axle, an outer gear case equipped with a gear chamber is fitted onto the inner gear case while maintaining the freedoms of steering and turning, the gear chamber being open toward the outside, a planetary gear mechanism is introduced into the gear chamber, the opening thereof is closed by attaching a cover supporting the front wheel axle over the outer gear case, and the front wheel axle is driven at a reduced speed by the planetary gear mechanism via a bevel gear mechanism which is driven by the front-wheel drive axle, the improvement being that an inner member of the front wheel axle extends into the gear chamber, and the sun gear of the planetary gear mechanism and the bevel gear on the output side of the bevel gear mechanism are allowed to rotate freely and as a unitary structure about the inner member. Therefore the length can be reduced by an amount corresponding to the lengths of the bearings that are hitherto employed for supporting the sun gear and the bevel gears. This means that the rigidity of the support of the front wheel axle does not decrease, and the gears can be assembled easily.

BRIEF DESCRIPTION OF THE DRAWINGS

FIGS. 1 to 4 illustrate embodiments of the present invention, in which:

FIG. 1 is a side view of a tractor;

FIG. 2 is a vertically sectioned front view of a front-wheel drive device;

FIG. 3 is a section along the line A—A of FIG. 2;

FIG. 4 is a vertically sectioned side view of a sun gear axle according to another embodiment.

DESCRIPTION OF THE PREFERRED EMBODIMENTS

Figure 1:
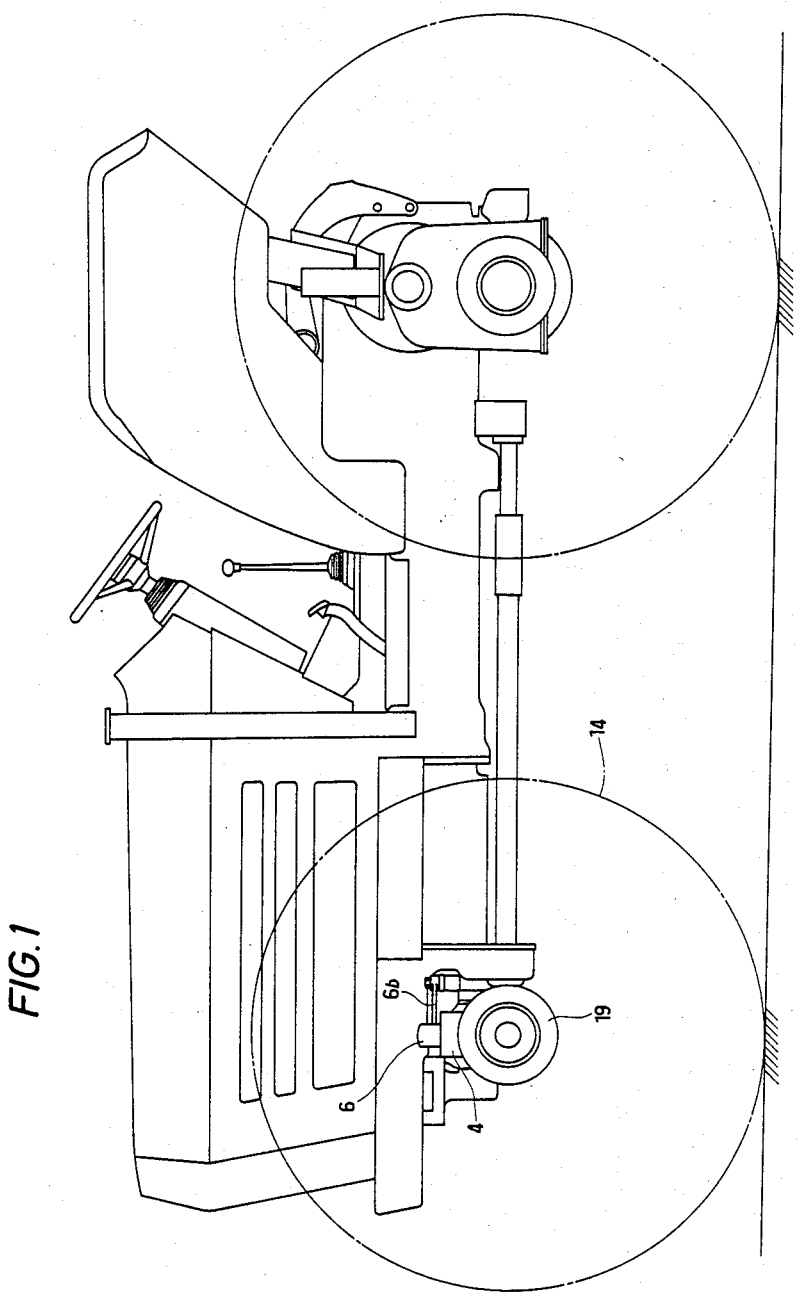

The concrete construction of the invention will be given below by way of the embodiments shown in the drawings. An inner gear case 3 having a cylindrical journal boss 3a at the lower end is mounted onto the outer end of a front axle housing 2 which contains a front-wheel drive axle 1, and an outer gear case 4 is equipped with a gear chamber 4a which is open to the external side and is equipped with a lower journal hole 4b. An upper journal hole 6a formed in a knuckle arm 6 secured to the top of the outer gear case 4 is rotatably fitted around a journal boss 5a of an upper cover 5 which fits over an opening at the upper end of the inner gear case 3. A lower journal hole 4b is also rotatably fitted around the journal boss 3a. A center axle 9 having bevel gears 7, 8 at the upper and lower ends thereof is supported by the inner gear case 3 via the bevel gear 7 and a bearing 10 and is also supported by the lower part of the outer gear case 4 via a bearing 11, concentric with the axes of the upper and lower journal bosses 5a and 3a. A bevel gear 13 secured to the outer end of the front-wheel drive axle 1 and supported by a bearing 12 meshes with the upper bevel gear 7 to constitute an upper bevel gear mechanism.

A carrier 16 is fitted to a front wheel axle 15 to which a front wheel 14 is attached. The front wheel axle 15 is supported by a cover 19 via a bearing 17 and a bearing 18 which is fitted to the carrier 16. A cylindrical axle member of a sun gear axle 22, which couples a bevel gear 20 and a sun gear 21 together as a unitary structure, is allowed to rotate freely about an inner member 15a of the front wheel axle 15 via bearings 23, and the sun gear axle 22 is prevented from escaping by a collar 24. An internal gear 25 is attached by a bolt 26 to the inner end surface of an insertion portion 19a of the cover 19 which is so formed that it is engaged closely with the opening of the gear chamber 4a. Planetary gears 27 are rotatably supported via bearings 29 by fixed shafts 28 that are attached to the carrier 16 around the periphery of the carrier 16 which has a hole 16a in the center thereof. The insertion portion 19a is fitted to the opening of the gear chamber 4a, and is fastened by bolts 30 so that the cover 19 is attached to the outer gear case 4. In this way, a planetary gear mechanism 31 is inserted into the gear chamber 4a with the planetary gears 27 meshing with both the internal gear 25 and the sun gear 21. A bevel gear mechanism 32 is constituted by the bevel gear 20 meshing with the lower bevel gear 8. The inner ring of bearing 17 on the outer side is retained by a nut 33 fitted around an external thread 15b of the front wheel axle 15, and the carrier 16 is maintained in position by the nut 33 and a stop ring 34 attached to the front wheel axle 15.

A wheel disc 35 and a rim 36 are attached to the front wheel axle 15, and a stop plate 37 which engages with notched portions of the fixed shafts 28 is fastened to the carrier 16 by bolts 38. The load in the vertical direction is supported by the lower end of the journal boss 3a and a thrust bearing 29 which is fitted into the lower part of the lower journal hole 4b.

Therefore, if an arm 6b of the knuckle arm 6 is turned by the steering mechanism (not shown), the outer gear case 4, the front wheel axle 15 and the front wheel 14 turn about the upper journal boss 5a, the lower journal boss 3a and the center axle 9 as the center. Further, if the front-wheel drive axle 1 is driven by a front wheel differential gear mechanism (not shown), the sun gear axle 22 is driven at a reduced speed via the bevel gear mechanism 32, and the carrier 16 is driven at an even more reduced speed because of the engagement of planetary gears 27 with the internal gear 25. Therefore, the front wheel axle 15 is driven at a sufficiently reduced speed.

Figure 2:
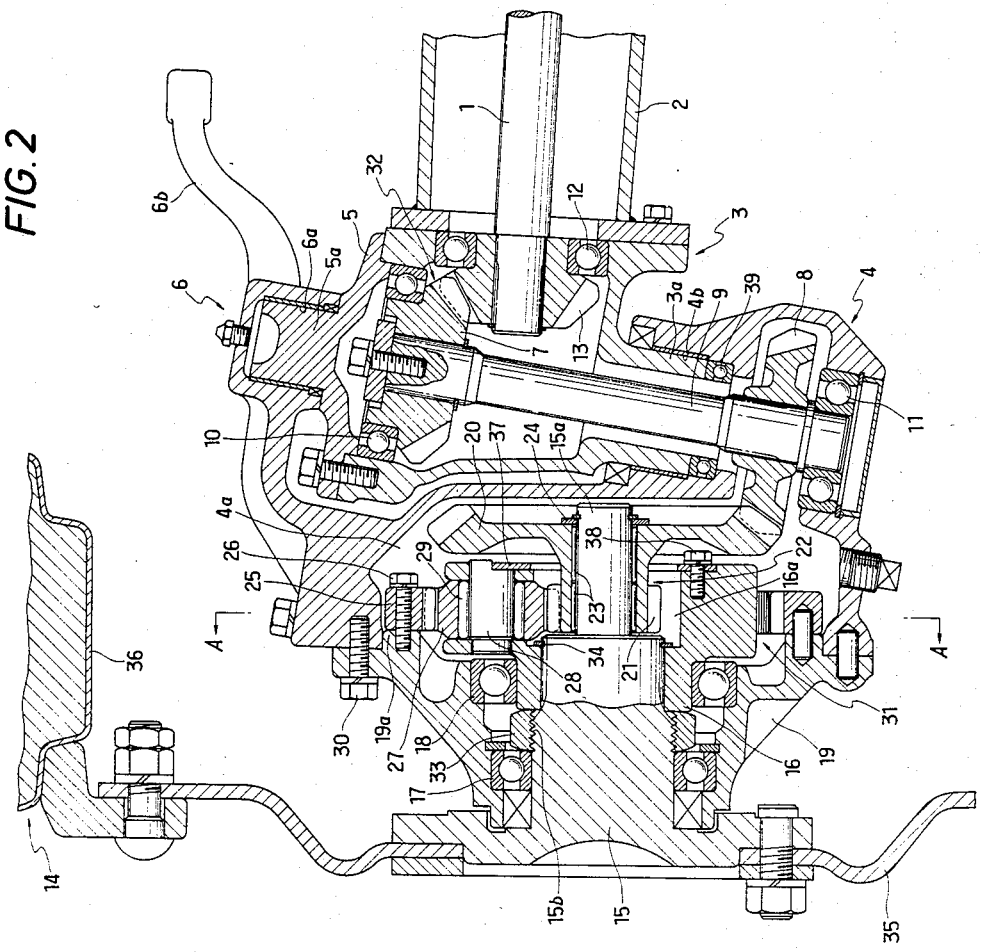
Figure 3:
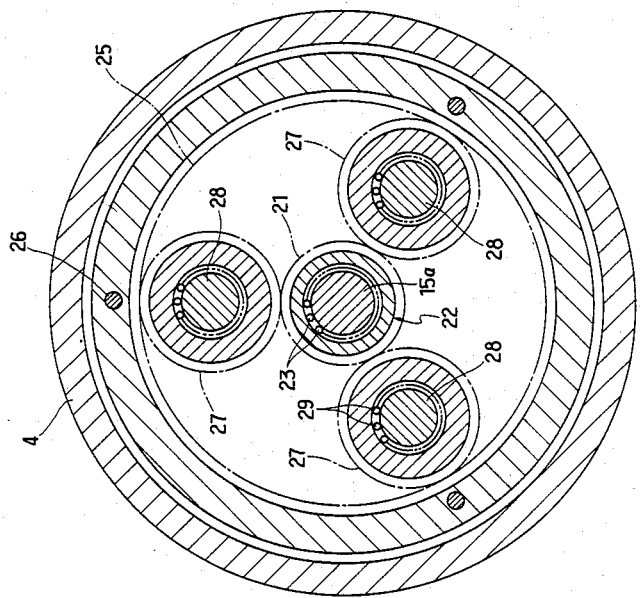
Figure 4:
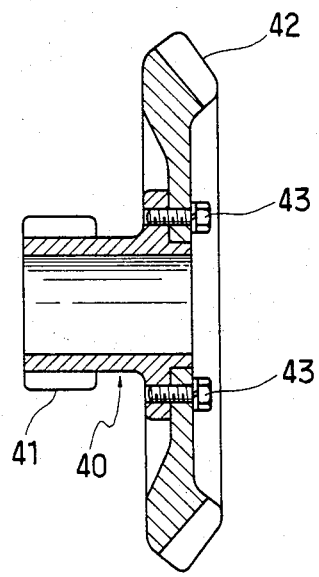
Figure 5:
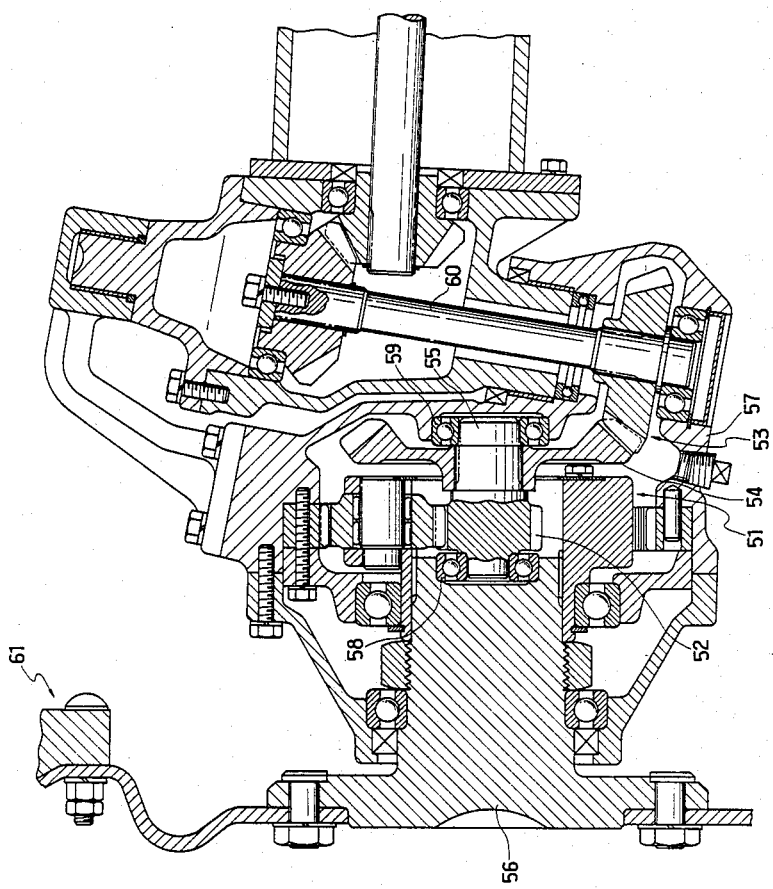
FIG. 5 is a vertically sectioned front view of a conventional front-wheel drive device.

In the embodiment of FIG. 2, the sun gear axle 22 has a sun gear 21 and a bevel gear 20 which are formed of the same material. These two gears, however, may be formed separately and coupled together. As shown in FIG. 4, for instance, the sun gear 41 only may be formed on the sun gear axle 40, and a separately formed bevel gear 42 may be fitted onto the sun gear axle 40 and thereto fastened by bolts 43. In the embodiment shown, furthermore, a needle bearing 23 is used to support the sun gear shaft 22 rotatably around the inner member 15a of the front wheel axle 15. Use, however, may be made of bush-like bearing.

According to the present invention, therefore, a front-wheel drive device for a vehicle is provided in which an inner gear case 3 is mounted onto the outer end of a front axle housing 2 which contains a front-wheel drive axle 1, an outer gear case 4 equipped with a gear chamber 4a which opens toward the outside is fitted onto the inner gear case 3 while maintaining the freedoms of steering and turning, a planetary gear mechanism 22 is introduced into the gear chamber 4a, the opening thereof is closed by attaching a cover 19 supporting a front wheel axle 15 over the outer gear case 4, and the front wheel axle 15 is driven at a reduced speed by planetary gear mechanism 22 via a bevel gear mechanism 32 which is driven by the front-wheel drive axle 1, the improvement being that an inner member 15a of the front wheel axle 15 extends into the gear chamber 4a, and a sun gear 21 of the planetary gear mechanism and a bevel gear on the output side of the bevel gear mechanism 32 are allowed to rotate freely and as a unitary structure around the inner member 15a. Therefore, the bearing supporting the sun gear 21 and the bevel gear 20 which are formed as a unitary structure can be contained within the space between the sun gear 21 and the bevel gear 20. In other words, the length of the portion supporting these gears can be reduced. Consequently, the distance from the journal bosses 5a, 3a (i.e., the center axle 9) to the front wheel 14 can be reduced when compared with that of the above conventional device, so that the rigidity of the support of the front wheel axle 15 increases, and a reduced force is required for the steering operation. Moreover, since the inner member 15a, about which the sun gear 21 and the bevel gear 20 on the output side rotate freely is formed with the front wheel axle 15 as a unitary structure, the operation of aligning and machining the inner member 15a can be effected easily. Further, since these two gears are supported by the inner member 15a, the front wheel axle 15 can be incorporated easily into the outer gear case 4.

What is claimed is:

1. In a front-wheel drive device for a vehicle in which an inner gear case is mounted onto an outer end of a front axle housing which contains
    a front-wheel drive axle,
    an outer gear case having a gear chamber opening toward the outside and fitted onto the inner gear case while maintaining the freedoms of steering and turning,
    a planetary gear mechanism in the gear chamber,
    the opening being closed by attaching a cover supporting the front wheel axle over the outer gear case, and
    the front wheel axle being driven at a reduced speed by the planetary gear mechanism via a bevel gear mechanism driven by the front-wheel drive axle,
the improvement wherein
    an inner member of the front wheel axle extends into the gear chamber, and
    the sun gear of the planetary gear mechanism and the bevel gear mechanism are allowed to freely rotate as a unitary structure about the inner member.

2. The improvement in accordance with claim 1, wherein
    said sun gear of the planetary gear mechanism and said bevel gear mechanism are of a homogeneous structure.

3. The improvement in accordance with claim 1, wherein
    said sun gear of the planetary gear mechanism and said bevel gear mechanism form a unitary structure, and
    a bearing that permits said unitary structure to freely rotate about the inner member.

* * * * *